(12) United States Patent
Sethi et al.

(10) Patent No.: US 12,260,305 B2
(45) Date of Patent: Mar. 25, 2025

(54) BATTERY LEARN CYCLE MANAGEMENT

(71) Applicant: Dell Products L.P., Round Rock, TX (US)

(72) Inventors: Parminder Singh Sethi, Ludhiana (IN); Bing Liu, Tianjin (CN); Vasanth Sathyanarayanan, Bangalore (IN); Lakshmi S. Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 1014 days.

(21) Appl. No.: 17/232,237

(22) Filed: Apr. 16, 2021

(65) Prior Publication Data

US 2022/0335326 A1 Oct. 20, 2022

(51) Int. Cl.
*G06N 20/00* (2019.01)
*G06F 1/26* (2006.01)

(52) U.S. Cl.
CPC ............. *G06N 20/00* (2019.01); *G06F 1/263* (2013.01)

(58) Field of Classification Search
CPC ......... G06N 20/00; G06N 20/20; G06F 1/263
USPC ........................................................ 320/133
See application file for complete search history.

(56) References Cited

U.S. PATENT DOCUMENTS

| 9,304,563 | B2 * | 4/2016 | Sieber | G06F 1/28 |
| 10,725,514 | B1 * | 7/2020 | Wang | G06F 1/263 |
| 2013/0091083 | A1 * | 4/2013 | Frisch | G01R 31/367 706/14 |
| 2014/0298045 | A1 * | 10/2014 | Sieber | G06F 1/263 713/300 |

* cited by examiner

*Primary Examiner* — Richard V Muralidar
(74) *Attorney, Agent, or Firm* — DALY, CROWLEY, MOFFORD & DURKEE, LLP

(57) ABSTRACT

In one aspect, an example methodology implementing the disclosed techniques includes, by a disk controller of a plurality of disks of a data storage system, collecting usage telemetry from the plurality of disks and initiating determination of one or more candidate time slots for performing a battery learn cycle using a machine learning model. The machine learning model is trained using the usage telemetry from the plurality of disks. The method also includes, by the disk controller, presenting one or more of the one or more candidate time slots for performing a battery learn cycle.

20 Claims, 5 Drawing Sheets

BATTERY LEARN CYCLE MANAGEMENT

BACKGROUND

During data transfer operations within a data storage system, a cache controller typically stores data in cache memory, which is much faster than writing to a physical disk. If the cache controller is implementing a write-back cache policy, the cache controller sends a data transfer completion signal once the data is written into the cache memory. The cached data is not written to the physical disk. The controller writes the cached data to corresponding locations in the physical disk only at specified intervals or under certain conditions, such as when system activity is low or when the write buffer approaches capacity. The performance gains from using write-back cache come with the risk that the cached data can be lost if there is an interruption in the supply of power to the data storage system before the cache data is written to the physical disk.

Accordingly, the data storage system may include battery backup modules that provide temporary backup power in the event the primary power source for the storage device is interrupted. Batteries used for such battery backup modules typically are rechargeable batteries, such as lithium ion batteries or nickel cadmium batteries, to provide two examples. The battery power may power the cache memory until the primary power source becomes stable again so that the cached data may then be reliably written to the physical disk.

Some battery types used in battery backup modules require a learn cycle to be performed periodically. During the learn cycle, the battery is discharged and then fully charged again. The holdover time of the battery is reduced to zero during discharge and then restored during full charge. The battery learn cycle process can take from a few hours to up to several hours and reduces as the battery capacity deteriorates over time. The battery learn cycle also updates tracked battery parameters (e.g., capacity, voltage, current, temperature and impedance) to allow the cache controller to estimate the capacity of the battery module and determine whether the battery can maintain the cache memory (i.e., the cached data) for a prescribed period of time in the event of a power loss.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a computer implemented method to determine candidate time slots for performing a battery learn cycle includes, by a disk controller of a plurality of disks of a data storage system, collecting usage telemetry from the plurality of disks, initiating determination of one or more candidate time slots for performing a battery learn cycle using a machine learning model, wherein the machine learning model is trained using the usage telemetry from the plurality of disks, and presenting one or more of the one or more candidate time slots for performing a battery learn cycle.

In some embodiments, the collection of the usage telemetry is from a time the disk controller is installed.

In some embodiments, the collection of the usage telemetry is from a time a firmware of the disk controller is updated.

In some embodiments, the usage telemetry includes percentage (%) idle time information. In one aspect, the % idle time information is an average % idle time across the plurality of disks.

In some embodiments, the machine learning model is a time series machine learning model.

In some embodiments, the presented one or more of the one or more candidate time slots include time slots prior to a due date for performing an automatic battery learn cycle.

In some embodiments, the presented one or more of the one or more candidate time slots include time slots subsequent to a due date for performing an automatic battery learn cycle.

In some embodiments, the presented one or more of the one or more candidate time slots include time slots subsequent to a reminder date for performing a battery learn cycle.

In some embodiments, the determination of the one or more candidate time slots for performing a battery learn cycle using the machine learning model is based on an estimation of a time needed to perform the battery learn cycle.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to collect usage telemetry from a plurality of disks of a data storage system, initiate determination of one or more candidate time slots for performing a battery learn cycle by use of a machine learning model, wherein the machine learning model is trained using the usage telemetry from the plurality of disks, and present one or more of the one or more candidate time slots for performing a battery learn cycle.

In some embodiments, to collect the usage telemetry is from a time the disk controller is installed or a firmware of the disk controller is updated.

In some embodiments, the usage telemetry includes percentage (%) idle time across the plurality of disks.

In some embodiments, the machine learning model is a time series machine learning model.

In some embodiments, the one or more of the one or more candidate time slots include time slots prior to a due date for performing an automatic battery learn cycle.

In some embodiments, the one or more of the one or more candidate time slots include time slots subsequent to a due date for performing an automatic battery learn cycle.

In some embodiments, the one or more of the one or more candidate time slots include time slots subsequent to a reminder date for performing a battery learn cycle.

In some embodiments, the determination of the one or more candidate time slots for performing a battery learn cycle by use of the machine learning model is based on an estimation of a time to perform the battery learn cycle.

In some embodiments, the plurality of disks includes a redundant array of inexpensive disks (RAID).

According to another illustrative embodiment provided to illustrate the broader concepts described herein, a computer program product includes one or more non-transitory machine-readable mediums encoding instructions that when executed by one or more processors cause a process to be carried out to determine candidate time slots for performing a battery learn cycle. The process includes collecting idle time telemetry from a plurality of disks of a data storage system, initiating determination of one or more candidate time slots for performing a battery learn cycle using a machine learning model, wherein the machine learning model is trained using idle time telemetry from the plurality of disks, and presenting one or more of the one or more candidate time slots for performing a battery learn cycle.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Battery backup modules may require a learn cycle to be performed periodically to calibrate the battery. During a battery learn cycle of a battery backup module, if the cache controller is implementing a write-back cache policy, the cache controller changes to a write-through cache policy until the learn cycle completes in order to prevent data loss in case of a power outage. In write-through caching, the data is written to the cache memory and the corresponding locations in the physical disk at the same time. The cache controller sends a data transfer completion signal once the data is written to the physical disk. Since the data is written to physical disk before sending the data transfer completion signal, the write-through cache policy reduces the risk that data can be lost in the cache memory in the event of a power outage. However, compared to write-back caching, write-through caching comes at a cost—i.e., higher latency (increased delay). As a result, read and write operations performed during battery learn cycle processing may suffer from increased latency when compared to read and write operations performed when the battery learn cycle processing is not being performed.

Embodiments of the concepts, techniques, and structures disclosed herein are directed to determining candidate time slots for performing a battery learn cycle in a data storage system. In embodiments, the determined candidate time slots are time slots during which disk input/output (I/O) operations (e.g., I/O operations per second) and/or disk I/O operations are expected to be low. As a result, a battery learn process performed during one of the candidate time slots is likely to have reduced (and ideally minimized) impact on disk input/output (I/O) performance. In some such embodiments, determination of such candidate time slots is achieved by collecting disk usage (e.g., percentage (%) idle time) telemetry, and applying the collected disk usage telemetry to a machine learning (ML) model. The ML model can then be used to predict or one or more candidate time slots for performing a battery learn cycle. The candidate time slots are estimated optimal time slots during which disk I/O operations are expected to be low based on the collected disk usage telemetry. In some embodiments, the prediction is also based on an estimation of a time needed to perform a battery learn cycle. These and other advantages, variations, and embodiments will be apparent in light of this disclosure.

Figure 1:
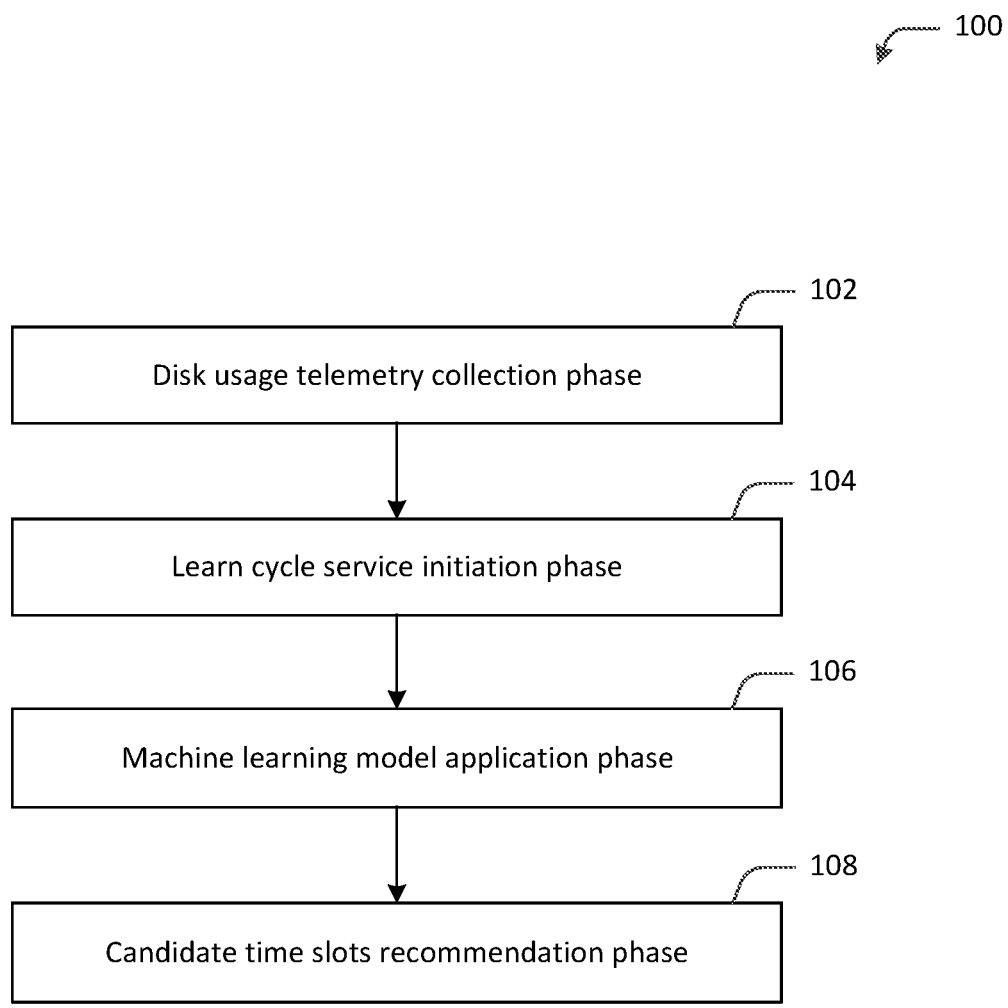
FIG. 1 is a diagram of an illustrative process to determine candidate time slots for performing a battery learn cycle, in accordance with an embodiment of the present disclosure.

Turning now to the figures, FIG. 1 is a diagram of an illustrative process 100 to determine candidate time slots for performing a battery learn cycle, in accordance with an embodiment of the present disclosure. Example processes and methods may include one or more operations, functions, or actions as illustrated by one or more of blocks 102, 104, 106, and/or 108, and may in some embodiments be performed by a computing system such as a computer system 500 of FIG. 5. The operations described in blocks 102-108 may also be stored as computer-executable instructions in a computer-readable medium, such as a volatile memory 504 and/or a non-volatile memory 508 of computing system 500, or some other non-transitory machine readable medium. In some embodiments, process 100 may be performed by components of a data storage system, such as, for example, a disk controller 202 of FIG. 2.

As depicted in FIG. 1, process 100 includes a disk usage telemetry collection phase, a learn cycle service initiation phase, a time series machine learning model application phase, and a candidate time slots recommendation phase. In more detail, and as can be seen at block 102, the disk usage telemetry collection phase includes periodically or continually collecting disk usage telemetry, including % idle time telemetry, from the disks (e.g., a redundant array of independent disks (RAID)) of a data storage system. In a RAID system, the data is distributed across a group of storage hard disk drives functioning as a single volume. Depending on the level of RAID implemented, data stored on each disk is duplicated or mirrored on other disks in the array, offering data redundancy to ensure no information is lost in the case of drive failure.

The % idle time telemetry may be periodically collected or otherwise retrieved from the individual disks in the RAID. The % idle time telemetry collected from a disk indicates the percentage of time the disk remained in an idle state. An idle state is a state or condition in which all the read/write operations are completed and there are no pending read/write operations on a specific disk. In the case of a disk array (e.g., a RAID system), the collected % idle time telemetry from the individual disks may be averaged to compute a % idle time of the disk array (e.g., the entire RAID).

The collected telemetry information (i.e., % idle time of the individual disks and the disk array) with corresponding timestamps may be stored or otherwise maintained in a data store, such as an embedded data store. A timestamp identifies a time (e.g., date and time of day) that the disk usage telemetry occurred. As an example, a timestamp of "Dec. 30, 2020: 7:00 am to 8:00 am" for an 80% idle time value may indicate that the disk array was in the idle state 80% of the time between 7:00 am to 8:00 am on Dec. 30, 20020. A specific timestamp may indicate a period that extends beyond one day (e.g., Dec. 1, 2020 10:00 pm to Dec. 2, 2020 5:00 am).

In some embodiments, the disk usage telemetry collection (i.e., periodic collection of the % idle time telemetry) may start from a time a disk controller (e.g., RAID controller) is installed or otherwise initiated in the data storage system. For example, if the disk controller was installed on Jan. 1, 2021, the periodic collection of % idle time telemetry from the individual disks may begin on Jan. 1, 2021.

In some embodiments, the disk usage telemetry collection (i.e., periodic collection of the % idle time telemetry) may start from a time a firmware of a disk controller (e.g., RAID controller) in the data storage system is updated. For example, if the disk controller firmware is updated on Feb. 1, 2021, the periodic collection of % idle time telemetry from the individual disks may begin on Feb. 1, 2021.

In some embodiments, a start time for the periodic collection of the % idle time telemetry may be a user configurable parameter. For example, a user (e.g., system administrator) may specify a desired time (e.g., a desired date and/or time) at which the periodic collection of the % idle time telemetry is to begin. The frequency with which the % idle time telemetry is collected may be predetermined, for example, by a manufacturer of the data storage system, and/or may be a user configurable parameter. As will be appreciated, the robustness of the collected % idle time telemetry from the disks can affect the ML model (i.e., training of a ML algorithm to build the ML model) and the quality of the predictions of time slots for performing a battery learn cycle.

With further reference to the example embodiment of FIG. 1, process 100 continues at block 104 with the learn cycle service initiation phase, where a learn cycle service is initiated to determine candidate time slots for performing a battery learn cycle. In an example implementation, a disk controller of the data storage system may send a signal to the learn cycle service to initiate the operations for determining the candidate time slots of the disk array. In such implementations, the sending of the signal may depend on a processing mode (e.g., an auto mode and a warn mode) of the battery learn cycle. For example, in the auto mode, a battery learn cycle may be automatically performed every predetermined number of days, such as, for example, every 80 days, 85 days, 90 days, or any suitable time, which may be predetermined by the manufacturer. If the auto mode is enabled, the disk controller may send the signal to the learn cycle service at a predetermined time (e.g., 2 days, 3 days, 4 days, etc.) prior to a next due date (i.e., next scheduled date) for performing an automatic battery learn cycle. The predetermined time may be configured or otherwise specified, for example, by a manufacturer of the data storage system, and/or may be a user configurable parameter. In an example implementation, when the auto mode is enabled, the learn cycle service may determine candidate time slots that are prior to the next due date for performing an automatic battery learn cycle. In some such implementations, the learn cycle service may also determine candidate time slots that are within a predetermined number of days subsequent to the next due date for performing an automatic battery learn cycle.

In the warn mode, a user can specify a time for performing a battery learn cycle. In this operating mode, the disk controller may generate a warning event on a reminder date to prompt the user to manually start a battery learn cycle. The reminder date may be a date on or prior to the specified time for performing the battery learn cycle. If the battery learn cycle is not performed (e.g., a scheduled battery learn cycle is deferred by a user), the disk controller may periodically (e.g., every 5 days, every 6 days, every 7 days, or any other suitable time period) generate a warning event until the battery learn cycle is performed. If the warn mode is enabled, the disk controller may send the signal to the learn cycle service upon a determination that the battery learn cycle has not been performed. In an example implementation, when the warn mode is enabled, the learn cycle service may determine candidate time slots that are within a predetermined number of days subsequent to the reminder date for performing the battery learn cycle.

Process 100 continues at block 106, where the machine learning model application phase begins. Here, a machine learning (ML) algorithm, such as a random forest or other suitable ensemble learning method for classification, regression, and other ML tasks, may be trained using the historical disk usage telemetry collected from the disks to build an ML model (e.g., a time series ML model). The ML model can then be applied to the collected disk usage telemetry to make predictions of time slots for performing a battery learn cycle. In some embodiments, a time series ML model is applied to the historical % idle time of the disk array (i.e., average disk array % idle time) to determine candidate time slots for performing a battery learn cycle. That is, the time series ML model can be used to predict the future values (e.g., candidate time slots) based on the previously observed data points (e.g., historical % idle time of the disk array) indexed in time order.

As previously explained, the battery learn cycle may operate in an auto mode or a warn mode. For example, in the auto mode, the time series ML model can be used to determine the candidate time slots (e.g., the optimal disk array % idle times) that are between the time the time series ML model is initiated (e.g., learn cycle service is initiated) to determine the candidate time slots and a next due date for performing an automatic battery learn cycle. Additionally or alternatively, the time series ML model can be used to also determine the candidate time slots that are within a predetermined number of days, such as 5 days, 6 days, 7 days, 8 days, or any other suitable time, subsequent to the next due date for performing an automatic battery learn cycle. In the warn mode, the time series ML model can be used to determine the candidate time slots that are within a predetermined number of days, such as 6 days, 7 days, 8 days, or any other suitable time, subsequent to a reminder date for performing the battery learn cycle.

In either the auto mode, warn mode, or any other mode, the time series ML model can predict a time slot that is within a single day or across multiple days. That is, the candidate time slot can span across multiple days, such as 2 days. For example, a candidate time slot may be from 27 Dec. 2020, 7:00 am to 27 Dec. 2020, 1:00 pm. As another example, a candidate time slot may be from 28 Dec. 2020, 11:00 pm to 29 Dec. 2020 4:00 am. In any case, a candidate time slot may include an indication of a disk array % idle time that is estimated for the time slot.

In some embodiments, the time series ML model can predict candidate time slots based on an estimate of the time needed to perform a battery learn cycle. For example, assuming that an estimate of the time needed to perform a battery learn cycle is 7 hours, the time series ML model can predict or discover candidate time slots that are of a duration of 7 hours and shorter. As another example, assuming that an estimate of the time needed to perform a battery learn cycle is 7 hours, the time series ML model can predict or discover candidate time slots that are of a duration between 7 hours to a predetermined time, such as 2.5 hours, 3 hours, 3.5 hours, or any other suitable time. Thus, some of the predicted candidate time slots may not be of a duration that covers the estimated time needed to perform a battery learn cycle.

The initial estimate of the time needed to perform a battery learn cycle may be configured or otherwise specified by a manufacturer of the data storage system. For subsequent battery learn cycles, the time needed to perform a battery learn cycle may decrease based on the condition of the battery. Thus, the time needed to perform the immediately preceding battery learn cycle may be used as an estimate of the time needed to perform a subsequent battery learn cycle. For example, suppose 6.5 hours were needed to perform the $i^{th}$ battery learn cycle. In this case, 6.5 hours may be used as an estimate of the time needed to perform the $i+1^{th}$ battery learn cycle. In an embodiment, the time needed to perform the individual battery learn cycles may be measured, and the measured times may be stored or otherwise maintained in a data store.

Process 100 continues at block 108, where the candidate time slots determined using the ML model (e.g., time series ML model) are recommended to a user. Here, the learn cycle service recommends the candidate time slots output from the ML model to a user. For example, the learn cycle service may send or otherwise provide the candidate time slots to a system console (e.g., data storage system console) for presenting via display on a console screen (e.g., user interface). This allows a user, such as a system administrator, to view the recommended candidate time slots and select a desired time slot for performing a battery learn cycle, for example. In an example implementation, the learn cycle service may order or otherwise arrange the candidate time slots from maximum disk array % idle time to minimum % disk array idle time and send the ordered list of candidate time slots to the system console.

In some embodiments, additional or alternative operations may be performed. For example, in some embodiments, prior to performing a battery learn cycle, a state of the disk array may be checked to determine whether the disk array is in a state that warrants not performing the battery learn cycle. In an example implementation, a disk controller may check the state of the disk array prior to initiating a scheduled battery learn cycle. For example, if the disk array is in a degraded or a rebuilding state due to a failed drive, for instance, performing a battery learn cycle may impact the disk array rebuild performance (e.g., increase the rebuild time), which may result in increased risk to data availability. If a determination is made that the disk array is in a degraded or a rebuilding state, the battery learn cycle may be rescheduled for a different time slot. Similarly, if a determination is made that the disk array is in a disk scrubbing state (e.g., data scrubbing is being performed), a file system verification state (e.g., file system verification is being performed), a file system garbage collection state (e.g., file system garbage collection is being performed), or any other internal disk maintenance state, the battery learn cycle may be rescheduled for a different time slot.

Figure 2:
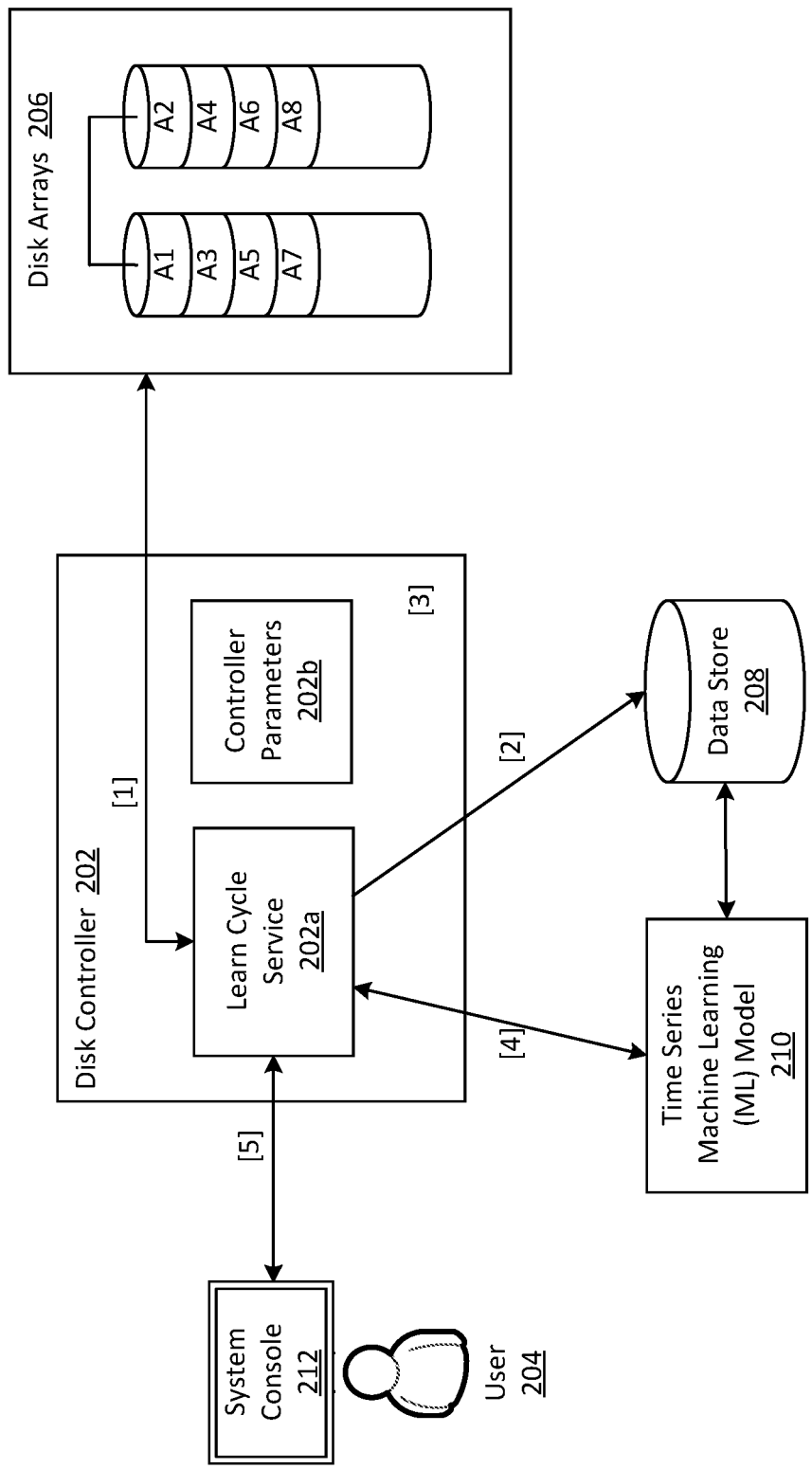
FIG. 2 is an illustration of an example disk controller deployment topology that can be used to recommend candidate time slots for performing a battery learn cycle, in accordance with an embodiment of the present disclosure.

FIG. 2 is an illustration of an example disk controller deployment topology that can be used to recommend candidate time slots for performing a battery learn cycle, in accordance with an embodiment of the present disclosure. Such a topology can be understood as a process in which a disk controller 202 (e.g., a RAID controller) leverages the services of a learn cycle service 202a to determine and recommend one or more candidate time slots for performing a battery learn cycle to a user 204, such as a system administrator. To this end, disk controller 202 may maintain a record of controller parameters 202b related to battery learn cycle processing. Nonlimiting examples of controller parameters 202b include a battery learn cycle mode (e.g., auto mode or warn mode), a battery learn cycle interval (e.g. interval at which the battery learn cycle is automatically initiated), an initial due date for performing a battery learn cycle, a predetermine time for initiating determination of candidate time slots, an estimate of time needed to perform a battery learn cycle, a next due date for performing an automatic battery learn cycle, and a reminder date to prompt to manually start a battery learn cycle.

In more detail, as shown in FIG. 2, learn cycle service 202a of disk controller 202 may periodically or continually requests and collects [1] disk usage telemetry, including % idle time telemetry from disk arrays 206. In some implementations, learn cycle service 202a may start collecting the disk usage telemetry from the disks in the disk array from the time disk controller 202 is installed. In certain implementations, learn cycle service 202a may additionally or alternatively start collecting the disk usage telemetry from the disks in the disk array from the time firmware is updated on disk controller 202. The % idle time telemetry collected from a disk indicates the percentage of time the disk remained in an idle state.

Upon collecting the disk usage telemetry, learn cycle service 202a may store [2] the disk usage telemetry in a data store 208. Data store 208 may include any type of computer-readable storage media (e.g., Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), non-volatile memory (NVM), or any other storage medium) configured for short-term or long-term storage of data. In an embodiment, data store 208 may be an embedded data store that is tightly integrated with disk controller 202. In some implementations, learn cycle service 202a may determine a % idle time of disk arrays 206, for example, by averaging the % idle time telemetry collected from the individual disks. In any case, learn cycle service 202a may store the disk usage telemetry (e.g., historical % idle time telemetry of the individual disks and % idle time of disk arrays 206) with a corresponding timestamp that identifies a time that the disk usage telemetry occurred.

Disk controller 202 may send or otherwise provide a signal [3] to learn cycle service 202a to determine candidate time slots for performing a battery learn cycle. The signal sent or otherwise provided by disk controller 202 to learn cycle service 202a serves as a triggering point for learn cycle 202a to initiate the operations for determining the candidate time slots. In some implementations, disk controller 202 may send or otherwise provide the signal to learn cycle service 202a at a predetermined time (e.g., 4 days) prior to a next due date (i.e., next scheduled date) for performing an automatic battery learn cycle. In certain implementations, disk controller 202 may additionally or alternatively send or otherwise provide the signal to learn cycle service 202a upon determining that a scheduled battery learn cycle has not been performed (e.g., a scheduled battery learn cycle was deferred by a user).

Upon receiving the signal from disk controller 202, learn cycle service 202a may determine the candidate time slots by applying [4] a time series machine learning (ML) model 210 to the historical disk usage telemetry stored on data store 208. In some embodiments, learn cycle service 202a may specify a time interval as an input to time series ML model 210. Here, the specified time interval indicates an estimate of the time needed to perform the battery learn cycle (i.e., the battery learn cycle that is to be performed). Based on the input time interval and the applied historical disk usage telemetry, time series ML model 210 predicts one or more candidate time slots for performing a battery learn cycle. The predicted candidate time slots are estimated optimal time slots during which disk arrays 206 I/O operations are expected to be low based on the applied historical disk usage telemetry. In some embodiments, the predicted candidate time slots may also be based on an estimate of the time needed to perform a battery learn cycle. The output (i.e., the predicted candidate time slots) from time series ML model 210 may be sent or otherwise provided to learn cycle service 202a.

Still referring to the illustration of FIG. 2, learn cycle service 202a may recommend [5] one or more of the candidate time slots output from time series ML model 210 to user 204. For example, learn cycle service 202a may send or otherwise provide the candidate time slots to a system console 212 for presenting via display on a console screen. This allows user 204 to view the recommended candidate time slots and select a desired time slot for performing a battery learn cycle, for example. In an example implementation, learn cycle service 202a may order or otherwise arrange the candidate time slots from maximum disk array % idle time to minimum % disk array idle time and send the ordered list of candidate time slots to system console 212.

Figure 3:
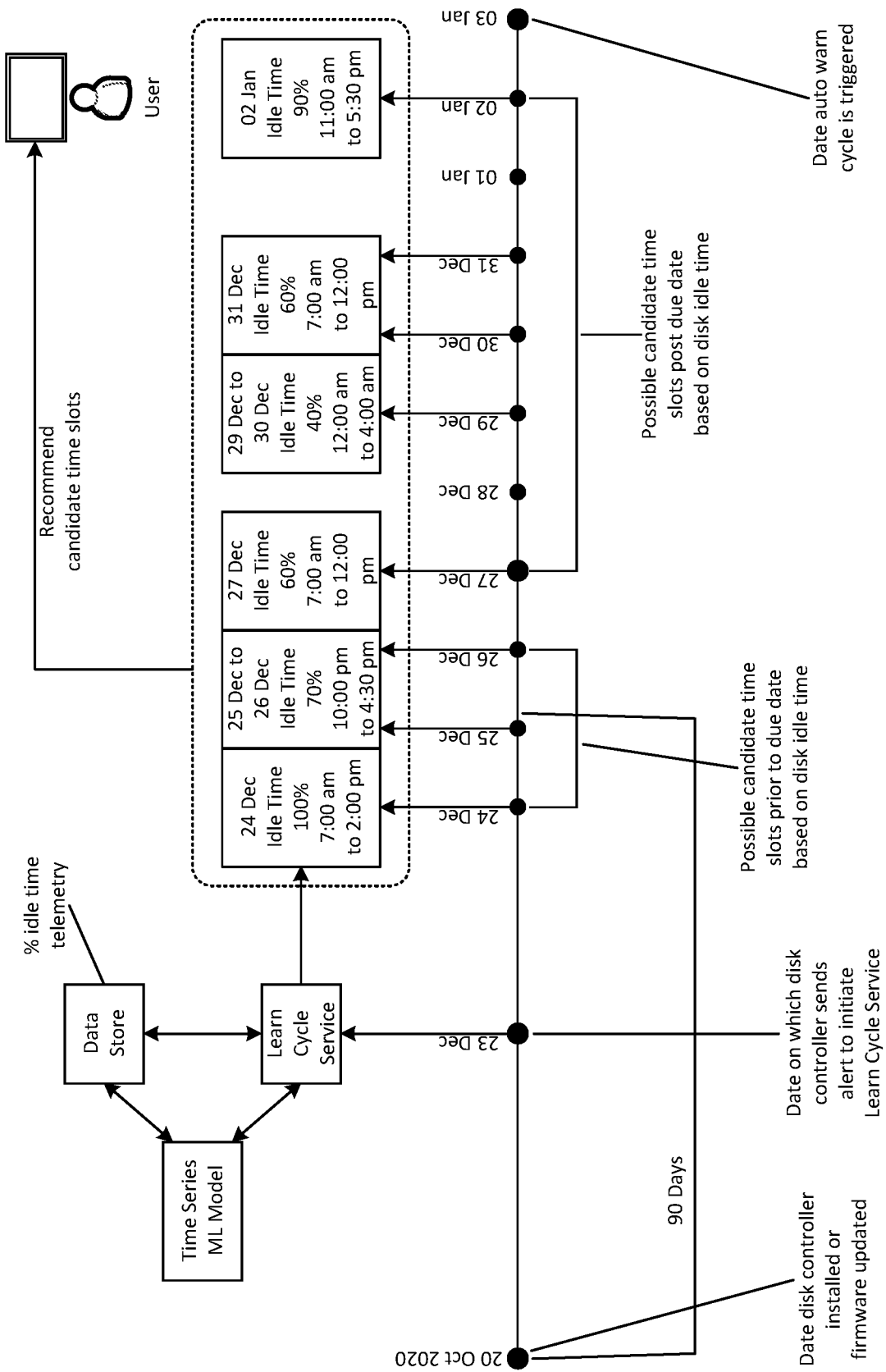
FIG. 3 is a diagram showing an infographic of an illustrative use case of a learn cycle service, in accordance with an embodiment of the present disclosure.

FIG. 3 is a diagram showing an infographic of an illustrative use case of learn cycle service 202a of FIG. 2, in accordance with an embodiment of the present disclosure. More specifically, the infographic shown in FIG. 3 illustrates the determination and recommendation of candidate time slots for a battery learn cycle (e.g., RAID battery learn cycle) that is in an auto processing mode. For example, in the auto mode, if a user (e.g., user 204 of FIG. 2) decides to defer the RAID battery learn cycle, learn cycle service 202a can determine and recommend candidate time slots that are available between the time learn cycle service 202a is initiated and a next due date for performing an automatic battery learn cycle and candidate time slots that are within a predetermined number of days (e.g., 7 days) subsequent to the next due date for performing an automatic battery learn cycle. The illustrative use case assumes the following operating conditions: the RAID controller is installed or firmware of the RAID controller is updated on 29 Oct. 2020; the battery learn cycle is in auto processing mode; the learn cycle interval is 90 days; the next due date for performing an automatic battery learn cycle is 27 Dec. 2020; the predetermined time to initiate learn cycle service 202a is set to 4 days prior to the next due date for performing an automatic battery learn cycle; and the estimate of the time needed to perform a battery learn cycle is 7 hours.

Still referring to the illustrative use case of FIG. 3, based on these operating conditions, as can be seen in FIG. 3, learn cycle service 202a periodically collects the % idle time telemetry information from the disks (e.g., disk arrays 206 of FIG. 2) from 29 Oct. 2020 and stores the collected telemetry in a data store (e.g., data store 208). On 23 Dec. 2020, which is 4 days prior to the next due date for performing an automatic battery learn cycle (i.e., 27 Dec. 2020), the RAID controller (e.g., disk controller 202 of FIG. 2) sends a signal to learn cycle service 202a to start determining the candidate time slots. Upon receiving the signal, on 23 Dec. 2020, learn cycle service 202a applies a machine learning model (e.g., time series machine learning model 210 of FIG. 2) to the collected % idle time telemetry. Based on the collected % idle time telemetry, time series machine learning model 210 predicts the candidate time slots for performing a battery learn cycle. As can be seen in FIG. 3, time series machine learning model 210 predicts 2 candidate time slots that are within the time period from 24 Dec. 2020 to 26 Dec. 2020 (i.e., "24 December Idle Time 100% 7:00 am to 2:00 pm" and "25 December to 26 December Idle Time 70% 10:00 pm to 4:30 pm"), and 4 candidate time slots that are within the time period from 28 Dec. 2020 to 3 Jan. 2021 (i.e., "27 December Idle Time 60% 7:00 am to 12:00 pm", "29 December to 30 December Idle Time 40% 12:00 am to 4:00 am", 31 December Idle Time 60% 7:00 am to 12:00 pm", and "2 January Idle Time 90% 11:00 am to 5:30 pm"). The candidate time slot "24 December Idle Time 100% 7:00 am to 2:00 pm" is an indication that from 7:00 am to 2:00 pm on 24 December, disk arrays 206 is expected (predicted) to be in the idle state 100% of the time. The candidate time slot "25 December to 26 December Idle Time 70% 10:00 pm to 4:30 pm" is an indication that from 10:00 pm on 25 December to 4:30 pm on 26 December, disk arrays 206 is expected to be in the idle state 70% of the time. The expected idle state information is similarly indicated for the other candidate time slots. Disk controller 202 can then present the predicted candidate time slots to user 204. In an example implementation, the candidate time slots may be presented in an ordered list from the candidate time slot having the maximum % idle time (i.e., highest % idle state) to the candidate time slot having the minimum % idle time (i.e., lowest % idle state). User 204 can then view the recommended candidate time slots and select a desired candidate time slot for performing a battery learn cycle.

Figure 4:
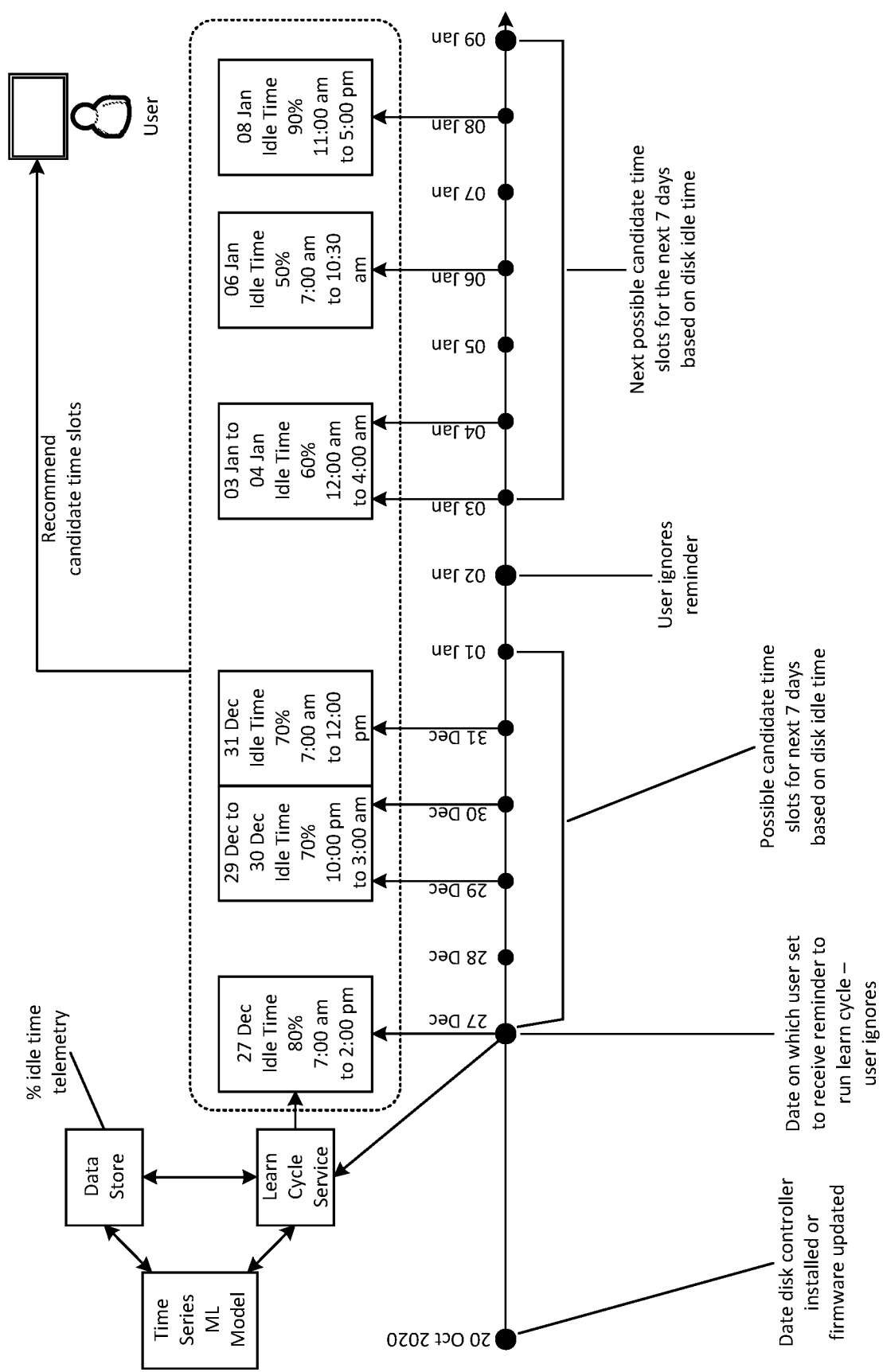
FIG. 4 is a diagram showing an infographic of another illustrative use case of a learn cycle service, in accordance with an embodiment of the present disclosure.

FIG. 4 is a diagram showing an infographic of another illustrative use case of learn cycle service 202a of FIG. 2, in accordance with an embodiment of the present disclosure. More specifically, the infographic shown in FIG. 4 illustrates the determination and recommendation of candidate time slots for a battery learn cycle (e.g., RAID battery learn cycle) that is in a warn processing mode. For example, in the warn mode, if a user (e.g., user 204 of FIG. 2) decides to defer the RAID battery learn cycle, learn cycle service 202a can determine and recommend candidate time slots that are available within a predetermined number of days (e.g., 7 days) subsequent to a reminder date for performing a battery learn cycle. The illustrative use case assumes the following operating conditions: the RAID controller is installed or firmware of the RAID controller is updated on 29 Oct. 2020; the battery learn cycle is in warn processing mode; the learn cycle interval is 90 days; the reminder to perform a battery learn cycle is set to 27 Dec. 2020; and the estimate of the time needed to perform a battery learn cycle is 7 hours.

Still referring to the illustrative use case of FIG. 4, based on these operating conditions, as can be seen in FIG. 4, learn cycle service 202a periodically collects the % idle time telemetry information from the disks (e.g., disk arrays 206 of FIG. 2) from 29 Oct. 2020 and stores the collected telemetry in a data store (e.g., data store 208). On 27 Dec. 2020, which is the reminder date for performing a battery learn cycle, if user 204 ignores the reminder, the RAID controller (e.g., disk controller 202 of FIG. 2) sends a signal to learn cycle service 202a to start determining the candidate time slots for the next 7 days. Upon receiving the signal, on 27 Dec. 2020, learn cycle service 202a applies a machine learning model (e.g., time series machine learning model 210 of FIG. 2) to the collected % idle time telemetry. Based on the collected % idle time telemetry, time series machine learning model 210 predicts the candidate time slots for performing a battery learn cycle. As can be seen in FIG. 4, time series machine learning model 210 predicts 3 candidate time slots that are within the time period from 27 Dec. 2020 to 2 Jan. 2021 (i.e., "27 December Idle Time 80% 7:00 am to 2:00 pm", "29 December to 30 December Idle Time 70% 10:00 pm to 3:00 am", and "31 December Idle Time 70% 7:00 am to 12:00 pm"). Disk controller 202 can then present the predicted candidate time slots to user 204. Subsequently, if user 204 ignores a reminder sent or otherwise provided on 2 Jan. 2021, disk controller 202 sends a signal to learn cycle service 202a to start determining the candidate time slots for the next 7 days. As can be seen in FIG. 4, time series machine learning model 210 predicts 3 candidate time slots that are within the time period from 2 Jan. 2021 to 9 Jan. 2021 (i.e., "3 January to 4 January Idle Time 60% 12:00 am to 4:00 am", "6 January Idle Time 50% 7:00 am to 10:30 am", and "8 January Idle Time 90% 11:00 am to 5:00 pm"). Disk controller 202 can then present the predicted candidate time slots to user 204. Disk controller 202 can send a signal to learn cycle service 202a to start determining the candidate time slots for the next 7 days each time user 204 ignores a reminder to perform a battery learn cycle.

Figure 5:
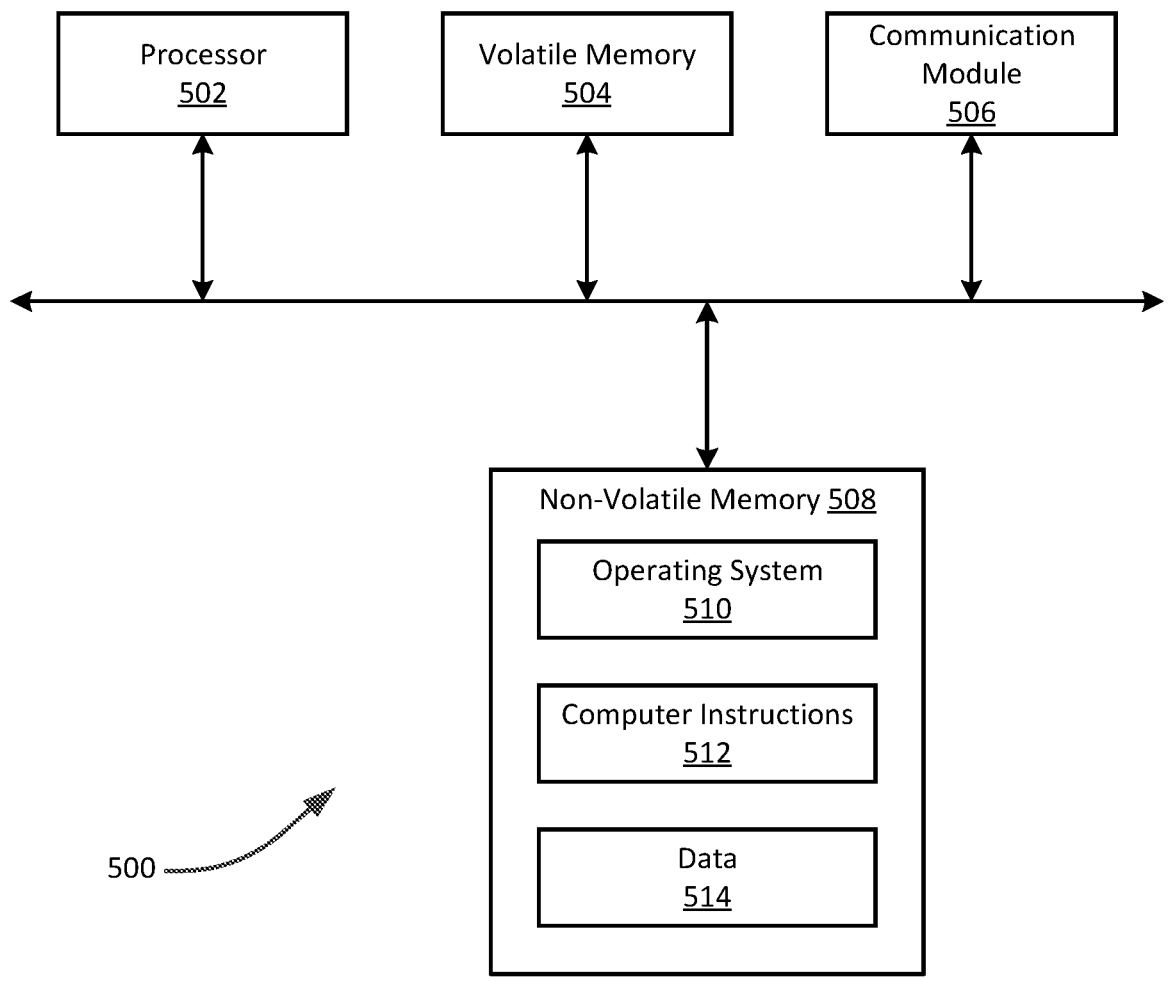
FIG. 5 schematically shows selective components of an illustrative computer system that may be used in accordance with an embodiment of the concepts, structures, and techniques disclosed herein.

FIG. 5 schematically shows selective components of an illustrative computer system 500 that may be used in accordance with an embodiment of the concepts, structures, and techniques disclosed herein. As shown, computer system 500 includes a processor 502, a volatile memory 504, a communication module 506 (e.g., network chip or chipset which allows for communication via a network, a bus, an interconnect, etc.), and a non-volatile memory 508 (e.g., hard disk). Non-volatile memory 508 stores an operating system 510, computer instructions 512, and data 514. In one example, computer instructions 512 are executed by processor 502 out of volatile memory 504 to perform all or part of the processes described herein (e.g., processes illustrated and described in reference to FIGS. 1 through 4).

These processes are not limited to use with particular hardware and software; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. In embodiments, the processor can include ASIC, FPGA, and/or other types of circuits. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes of FIGS. 1 through 4 are not limited to the specific processing order illustrated. Rather, any of the processing blocks of the Figures may be re-ordered, combined or removed, performed in parallel or in serial, as necessary, to achieve the results set forth above.

The processing blocks associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device, or a logic gate. It is understood that embodiments of event synchronization are applicable to a variety of systems, objects and applications.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A computer implemented method to determine candidate time slots for performing a battery learn cycle, the method comprising:
   collecting, by a disk controller of a plurality of disks of a data storage system, disk usage telemetry from the plurality of disks;
   initiating, by the disk controller, prediction of one or more candidate time slots for performing a battery learn cycle using a machine learning model, wherein the machine learning model is trained using the disk usage telemetry from the plurality of disks;
   presenting, by the disk controller, one or more of the one or more candidate time slots for performing a battery learn cycle; and
   performing the battery learn cycle according to the one or more candidate time slots.

2. The method of claim 1, wherein the collection of the disk usage telemetry is from a time the disk controller is installed.

3. The method of claim 1, wherein the collection of the disk usage telemetry is from a time a firmware of the disk controller is updated.

4. The method of claim 1, wherein the disk usage telemetry includes percentage (%) idle time information.

5. The method of claim 4, wherein the % idle time information is an average % idle time across the plurality of disks.

6. The method of claim 1, wherein the machine learning model is a time series machine learning model.

7. The method of claim 1, wherein the presented one or more of the one or more candidate time slots include time slots prior to a due date for performing an automatic battery learn cycle.

8. The method of claim 1, wherein the presented one or more of the one or more candidate time slots include time slots subsequent to a due date for performing an automatic battery learn cycle.

9. The method of claim 1, wherein the presented one or more of the one or more candidate time slots include time slots subsequent to a reminder date for performing a battery learn cycle.

10. The method of claim 1, wherein the prediction of the one or more candidate time slots for performing a battery learn cycle using the machine learning model is based on an estimation of a time needed to perform the battery learn cycle.

11. A system comprising:
one or more non-transitory machine-readable mediums configured to store instructions; and
one or more processors configured to execute the instructions stored on the one or more non-transitory machine-readable mediums, wherein execution of the instructions causes the one or more processors to,
collect disk usage telemetry from a plurality of disks of a data storage system;
initiate prediction of one or more candidate time slots for performing a battery learn cycle by use of a machine learning model, wherein the machine learning model is trained using the disk usage telemetry from the plurality of disks;
present one or more of the one or more candidate time slots for performing a battery learn cycle;
perform the battery learn cycle according to the one or more candidate time slots.

12. The system of claim 11, wherein to collect the disk usage telemetry is from a time the disk controller is installed or a firmware of the disk controller is updated.

13. The system of claim 11, wherein the disk usage telemetry includes percentage (%) idle time across the plurality of disks.

14. The system of claim 11, wherein the machine learning model is a time series machine learning model.

15. The system of claim 11, wherein the one or more of the one or more candidate time slots include time slots prior to a due date for performing an automatic battery learn cycle.

16. The system of claim 11, wherein the one or more of the one or more candidate time slots include time slots subsequent to a due date for performing an automatic battery learn cycle.

17. The system of claim 11, wherein the one or more of the one or more candidate time slots include time slots subsequent to a reminder date for performing a battery learn cycle.

18. The system of claim 11, wherein the determination-prediction of the one or more candidate time slots for performing a battery learn cycle by use of the machine learning model is based on an estimation of a time to perform the battery learn cycle.

19. The system of claim 11, wherein the plurality of disks includes a redundant array of inexpensive disks (RAID).

20. A computer program product including one or more non-transitory machine-readable mediums encoding instructions that when executed by one or more processors cause a process to be carried out to determine candidate time slots for performing a battery learn cycle, the process comprising:
collecting disk idle time telemetry from a plurality of disks of a data storage system;
initiating prediction of one or more candidate time slots for performing a battery learn cycle using a machine learning model, wherein the machine learning model is trained using the disk idle time telemetry from the plurality of disks;
presenting one or more of the one or more candidate time slots for performing a battery learn cycle;
performing the battery learn cycle according to the one or more candidate time slots.

* * * * *